(12) United States Patent
Iida

(10) Patent No.: US 7,599,170 B2
(45) Date of Patent: Oct. 6, 2009

(54) SOLID ELECTROLYTIC CAPACITOR ELEMENT, MANUFACTURING METHOD THEREFOR, AND SOLID ELECTROLYTIC CAPACITOR

(75) Inventor: Takahisa Iida, Hirakata (JP)

(73) Assignee: SANYO Electric Co., Ltd., Moriguchi (JP)

( * ) Notice: Subject to any disclaimer, the term of this patent is extended or adjusted under 35 U.S.C. 154(b) by 238 days.

(21) Appl. No.: 11/438,769

(22) Filed: May 23, 2006

(65) Prior Publication Data

US 2006/0268494 A1    Nov. 30, 2006

(30) Foreign Application Priority Data

May 26, 2005    (JP)    ............... 2005-154666

(51) Int. Cl.
*H01G 9/04*    (2006.01)
*H01G 9/145*    (2006.01)
*H01G 9/00*    (2006.01)

(52) U.S. Cl. ...................... 361/532; 361/523

(58) Field of Classification Search .................. 361/523, 361/532
See application file for complete search history.

(56) References Cited

U.S. PATENT DOCUMENTS 4,490,282 A * 12/1984 Corboy et al. ............... 252/503
5,571,638 A * 11/1996 Satoh et al. .................. 429/248
6,103,420 A *  8/2000 Nakane et al. ............... 429/223
2003/0137799 A1*  7/2003 Igaki et al. ................... 361/523
2005/0128685 A1*  6/2005 Hasegawa .................... 361/525

FOREIGN PATENT DOCUMENTS

JP          59179650 A   * 10/1984
JP        2000-025236       8/2001

OTHER PUBLICATIONS

Derwent abstract of JP59179650A.*

* cited by examiner

*Primary Examiner*—Eric Thomas
*Assistant Examiner*—David M Sinclair
(74) *Attorney, Agent, or Firm*—Masuvalley & Partners

(57) ABSTRACT

In a solid electrolytic capacitor of the present invention, a virtually plate-like anode having a porous sintered body, a dielectric layer, and an electrolyte layer are sequentially formed on an anode lead so as to cover a portion of the anode lead. A cathode includes a first electrically conductive layer containing graphite particles having a grain size of approximately 1 μm to approximately 10 μm and APTES; and a second electrically conductive layer including silver particles is formed on the electrolyte layer so as to cover an area surrounding the electrolyte layer. Also, the cathode and a cathode terminal are interconnected through an electrically conductive adhesive layer, and the anode lead and an anode terminal are welded to each other. Further, a mold-packaging resin is formed such that respective edges of the cathode terminal and the anode terminal are located outside the mold-packaging resin.

10 Claims, 1 Drawing Sheet

SOLID ELECTROLYTIC CAPACITOR ELEMENT, MANUFACTURING METHOD THEREFOR, AND SOLID ELECTROLYTIC CAPACITOR

This application claims priority under 35 U.S.C. §119 from Japanese patent application number 2005-154666, filed May 26, 2005.

TECHNICAL FIELD

The present invention relates to a solid electrolytic capacitor element, a manufacturing method therefor, and a solid electrolytic capacitor.

BACKGROUND OF INVENTION

A solid electrolytic capacitor in which an equivalent series resistance (hereinafter referred to as an ESR) value is low in a high frequency region has conventionally been known. An example of such a conventional solid electrolytic capacitor is disclosed in Japanese published unexamined application No. 2001-217159.

FIG. 2 is a cross-sectional view for illustrating the structure of a conventional solid electrolytic capacitor. The structure of the conventional solid electrolytic capacitor will herein after be described in reference to FIG. 2.

As shown in FIG. 2, in the conventional solid electrolytic capacitor, a virtually plate-like anode 101 comprised of a tantalum porous sintered body that is fabricated by sintering tantalum powder with an average grain size of approximately 2 µm, in vacuum, is formed on an anode lead 101a comprised of tantalum so as to cover a portion of the anode lead 101a.

A dielectric layer 102 comprised of tantalum oxide is formed on the anode 101 so as to cover an area surrounding the anode 101. Also, an electrolyte layer 103 comprised of polypyrrole is formed on the dielectric layer 102 so as to cover an area surrounding the dielectric layer 102.

An intermediate layer 104 containing a mixture of polypyrrole and carbon particles is formed on the electrolyte layer 103 so as to virtually uniformly cover an area surrounding the electrolyte layer 103.

A cathode 105 is formed on the intermediate layer 104 so as to cover an area surrounding the intermediate layer 104. The cathode 105 is comprised of a first electrically conductive layer 105a consisting mainly of graphite particles, which is formed so as to cover the area surrounding the intermediate layer 104; and a second electrically conductive layer 105b consisting mainly of silver particles, which is formed so as to cover an area surrounding the first electrically conductive layer 105a.

The top surface of an area surrounding the cathode 105 is formed with an electrically conductive adhesive layer 106, through which the cathode 105 and a cathode terminal 107 are interconnected. Also, an anode terminal 108 is welded onto the anode lead 101a exposed from the anode 101. A mold-packaging resin 109 is formed around the second electrically conductive layer 105b, the cathode terminal 107 and an anode terminal 108 such that respective edges of the cathode and anode terminals 107 and 108 can be located outside. The conventional solid electrolytic capacitor is thus configured.

As described above, in the conventional solid electrolytic capacitor, the intermediate layer 104 containing the mixture of polypyrrole and carbon particles, which comprise the electrolyte layer 103 and the cathode 105 respectively, is formed between the electrolyte layer 103 and the cathode 105.

BRIEF SUMMARY OF THE INVENTION

A solid electrolytic capacitor element of the present invention comprises: a dielectric layer consisting mainly of an oxide of a metal, the dielectric layer being formed on an anode consisting mainly of the metal; an electrolyte layer consisting mainly of manganese oxide or an electrically conductive polymer, the electrolyte layer being formed on the dielectric layer; and a cathode having an electrically conductive layer containing carbon particles and an organic silane, the cathode being formed on the electrolyte layer.

In addition, in the above-described solid electrolytic capacitor element, the cathode having the electrically conductive layer containing carbon particles and an organic silane is formed on the electrolyte layer consisting mainly of manganese oxide or an electrically conductive polymer, as described above. The organic silane has good adhesiveness to manganese oxide, an electrically conductive polymer, and carbon, and therefore the adhesiveness between the electrically conductive layer containing both of carbon particles and an organic silane and the electrolyte layer can be improved. This enables the contact resistivity between the electrolyte layer and the cathode having the above electrically conductive layer to be reduced, and therefore a solid electrolytic capacitor element with a low equivalent series resistance (ESR) value in a high frequency region can be obtained.

In the above-described solid electrolytic capacitor element, the organic silane preferably includes at least one organic silane selected from the group consisting of aminopropyltriethoxysilane (APTES), octadecyltriethoxysilane (OTES), n-propyltrichlorosilane (nPTCS), dimethoxydiphenylsilane (DMDPS), and mercaptopropyltrimethoxysilane (MPTMS). Configuring in this manner enables the adhesiveness between the electrolyte layer and the cathode to be further improved, and therefore the contact resistance between the electrolyte layer and the cathode can be further reduced, resulting in a solid electrolytic capacitor element with a low ESR value.

In the above-described solid electrolytic capacitor element, the electrically conductive layer preferably contains the organic silane in the range of approximately 0.1 wt. % to approximately 5.5 wt. % out of a total of the organic silane and the carbon particles. Alternatively, the electrically conductive layer may be configured to contain the organic silane in the range of approximately 0.8 wt. % to approximately 3.3 wt. % out of a total of the organic silane and the carbon particles. Configuring in this manner enables the adhesiveness between the electrolyte layer and the cathode to be further improved, and therefore the contact resistance between the electrolyte layer and the cathode can be further reduced, resulting in a solid electrolytic capacitor element with a low ESR value.

Also, the cathode may have a laminated structure comprised of a first electrically conductive layer containing carbon particles and an organic silane, and a second electrically conductive layer consisting mainly of silver particles.

Further, the first electrically conductive layer may be configured to have a thickness of approximately 2 µm to approximately 15 µm.

In addition, in case that the first electrically conductive layer containing carbon particles and an organic silane has a small thickness, the electrically conductive layer cannot be uniformly formed, resulting in a high ESR value. Similarly, in case of a large thickness of the electrically conductive layer, the ESR value is also high due to resistance of the electrically conductive layer itself. Accordingly, it can be considered that the thickness of the entire electrically conductive layer is preferably from approximately 2 µm to approximately 15 µm.

Also, as a metal comprising the anode, a valve metal such as tantalum, aluminum, niobium, or titanium is preferably used. Configuring in this manner enables the dielectric layer consisting mainly of an oxide of the valve metal to be readily obtained by anodizing the anode consisting mainly of the valve metal.

Further, the above-described organic silane may include aminopropyltriethoxysilane (APTES).

Alternatively, the above-described organic silane may include octadecyltriethoxysilane (OTES).

Still alternatively, the above-described organic silane may include n-propyltrichlorosilane (nPTCS).

Also, the method for manufacturing a solid electrolytic capacitor element comprises the steps of forming on an anode consisting mainly of the metal a dielectric layer consisting mainly of an oxide of a metal; forming on the dielectric layer an electrolyte layer consisting mainly of manganese oxide or an electrically conductive polymer; and forming on the electrolyte layer a cathode having an electrically conductive layer containing carbon particles and an organic silane by soaking the electrolyte layer into an aqueous solution containing the carbon particles and the organic silane.

Further, the step of forming the cathode may include the step of drying the electrolyte layer after the electrolyte layer has been soaked into the aqueous solution.

A concentration of the organic silane in the above-described aqueous solution may be from approximately 0.1 wt. % to approximately 5.5 wt. % out of a total of the organic silane and the carbon particles.

A concentration of the organic silane in the above-described aqueous solution may be from approximately 0.8 wt. % to approximately 3.3 wt. % out of a total of the organic silane and the carbon particles.

Also, the aqueous solution may contain at least one organic silane selected from the group consisting of aminopropyltriethoxysilane (APTES), octadecyltriethoxysilane (OTES), n-propyltrichlorosilane (nPTCS), dimethoxydiphenylsilane (DMDPS), and mercaptopropyltrimethoxysilane (MPTMS).

In particular, the aqueous solution may be configured to contain aminopropyltriethoxysilane (APTES).

In particular, the aqueous solution may be configured to contain octadecyltriethoxysilane (OTES).

In particular, the aqueous solution may be configured to contain n-propyltrichlorosilane (nPTCS).

Also, a solid electrolytic capacitor is configured to comprise: a dielectric layer consisting mainly of an oxide of a metal, the dielectric layer being formed on an anode consisting mainly of the metal; an electrolyte layer consisting mainly of manganese oxide or an electrically conductive polymer, the electrolyte layer being formed on the dielectric layer; and a cathode having an electrically conductive layer containing carbon particles and an organic silane, the cathode being formed on the electrolyte layer; wherein an anode terminal is formed on the anode, a cathode terminal is formed on the cathode, and a mold resin is formed such that respective edges of the anode terminal and the cathode terminal are located outside.

DETAILED DESCRIPTION OF INVENTION

Examples of the present invention will hereinafter be described in reference to the drawings.

Example 1

Figure 1:
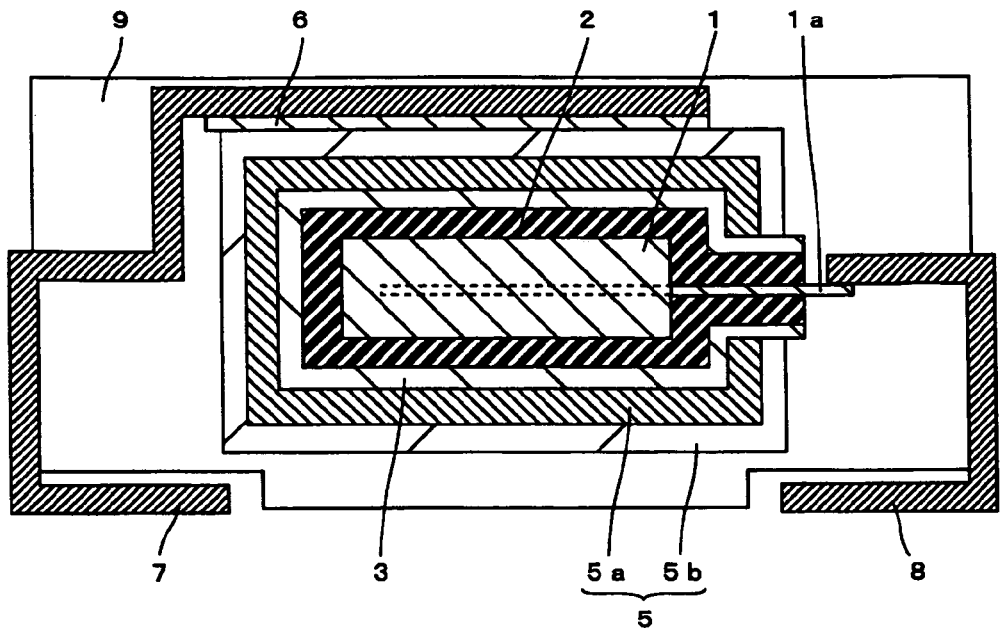
FIG. 1 is a cross-sectional view for illustrating the structure of a solid electrolytic capacitor according to Example 1 of the present invention.
Figure 2:
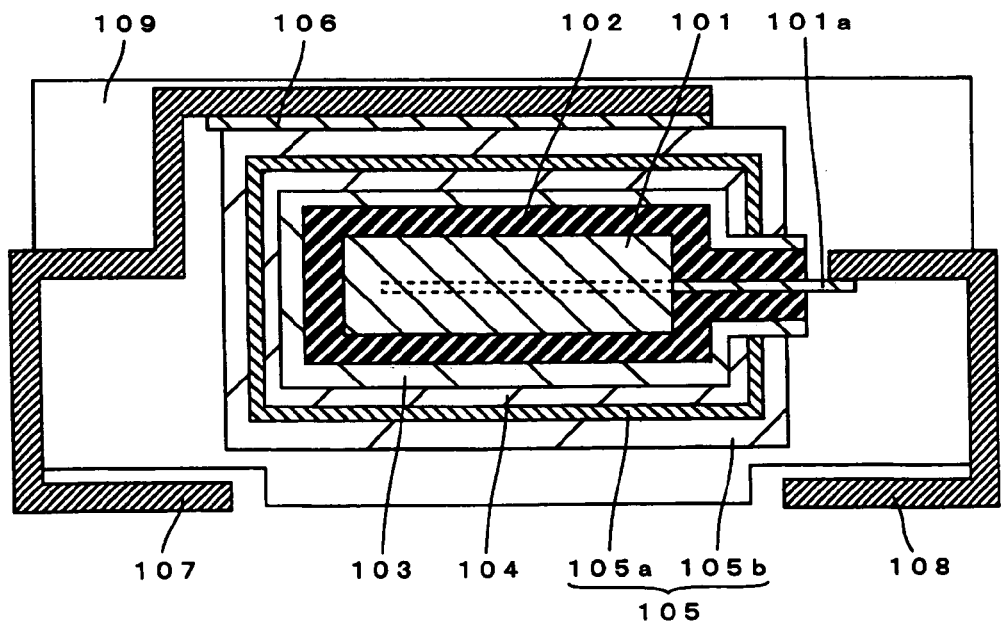
FIG. 2 is a cross-sectional view for illustrating the structure of the conventional solid electrolytic capacitor.

FIG. 1 is a cross-sectional view for illustrating the structure of a solid electrolytic capacitor according to Example 1 of the present invention. The structure of the solid electrolytic capacitor according to Example 1 of the present invention is described in reference to FIG. 1.

As shown in FIG. 1, in the solid electrolytic capacitor according to Example 1 of the present invention, a virtually plate-like anode 1 comprised of a tantalum porous sintered body that is fabricated by sintering tantalum powder with an average grain size of approximately 2 μm, in vacuum, is formed on an anode lead 1a comprised of tantalum so as to cover a portion of the anode lead 1a, where the tantalum is one example of a "metal" comprising the anode of the present invention.

A dielectric layer 2 comprised of tantalum oxide is formed on the anode 1 so as to cover an area surrounding the anode 1. Also, an electrolyte layer 3 comprised of polypyrrole is formed on the dielectric layer 2 so as to cover an area surrounding the dielectric layer 2, where the polypyrrole is one example of an "electrically conductive polymer" of the present invention.

A cathode 5 is formed on the electrolyte layer 3 so as to cover an area surrounding the electrolyte layer 3. The cathode 5 is comprised of: a first electrically conductive layer 5a having a thickness of approximately 10 μm, which is formed so as to cover the area surrounding the electrolyte layer 3; and a second electrically conductive layer 5b having a thickness of approximately 10 μm and consisting mainly of silver particles, which is formed so as to cover an area surrounding the first electrically conductive layer 5a. The first electrically conductive layer 5a contains graphite particles with a grain size of approximately 1 μm to approximately 10 μm and aminopropyltriethoxysilane (APTES), where the first electrically conductive layer is one example of an "electrically conductive layer" of the present invention. Also, the graphite particles and APTES are examples of "carbon particles" and an "organic silane" of the present invention, respectively.

The top surface of an area surrounding the cathode 5 is formed with an electrically conductive adhesive layer 6, through which the cathode 5 and a cathode terminal 7 are interconnected. Also, an anode terminal 8 is welded onto the anode lead 1a being exposed from the anode 1. Further, a mold-packaging resin 9 is formed around the second electrically conductive layer 5b, the cathode terminal 7 and the anode terminal 8 such that respective edges of the cathode 7 and the anode terminal 8 can be located outside. The solid electrolytic capacitor according to Example 1 of the present invention is thus configured.

Next, a method for manufacturing the solid electrolytic capacitor shown in FIG. 1 according to Example 1 of the present invention is described.

The anode 1 was first formed on the anode lead 1a comprised of tantalum by molding tantalum powder with a grain size of approximately 2 μm in a virtually plate-like shape so as to cover the portion of the anode lead 1a and then sintering the molding in vacuum.

Then, the anode 1 was anodized in an approximately 0.1 wt. % phosphoric acid solution, which was held at approximately 60° C., by applying a constant voltage of approximately 8 V for approximately 10 hours. This allowed the dielectric layer 2 comprised of tantalum to be formed so as to cover the area surrounding the anode 1.

Subsequently, the electrolyte layer 3 comprised of polypyrrole is formed on the dielectric layer 2 by chemical polymerization, and so on.

Subsequently, an aqueous solution was prepared in such a way that graphite particles with a grain size of approximately 1 μm to approximately 10 μm, water, and a binder were mixed in a weight ratio of approximately 1:10:0.0005, and APTES was further added in an amount of approximately 1.1 wt. % out of a total weight of the APTES and the graphite particles.

Thereafter, soaking the anode 1 formed with the electrolyte layer 3 into the aqueous solution containing the above-described APTES and graphite particles allowed the graphite particles and the APTES to be uniformly deposited onto the surface of the electrolyte layer 3. Then, by drying the anode 1 at approximately 90° C. for approximately 10 minutes, the first electrically conductive layer 5a containing the graphite particles with a grain size of approximately 1 μm to 10 μm and the APTES was formed on the electrolyte layer 3. At this time, an APTES concentration in the first electrically conductive layer 5a was approximately 1.1 wt. % out of the total weight of the APTES and the graphite particles.

On the other hand, the second electrically conductive layer 5b having a thickness of approximately 10 μm and consisting mainly of silver particles was formed by coating a silver paste on the first electrically conductive layer 5a so as to cover the area surrounding the first electrically conductive layer 5a and then drying the paste at approximately 170° C. for approximately 30 minutes. Thus, the cathode 5 wherein the first electrically conductive layer 5a and the second electrically conductive layer 5b were laminated was formed on the electrolyte layer 3 so as to cover the area surrounding the electrolyte layer 3.

Then, after an electrically conductive adhesive had been coated on the cathode terminal 7, the cathode 5 and the cathode terminal 7 were brought into contact with each other through the electrically conductive adhesive. The electrically conductive adhesive layer 6 through which the cathode 5 and the cathode terminal 7 were interconnected was formed by drying the electrically conductive adhesive at approximately 60° C. for approximately 30 minutes while pressing it with the cathode 5 and the cathode terminal 7.

Subsequently, the anode terminal 8 was connected onto the anode lead 1a. Further, the mold-packaging resin 9 was formed such that respective edges of the cathode terminal 7 and the anode terminal 8 were able to be located outside. The solid electrolytic capacitor according to Example 1 of the present invention was thus fabricated.

Example 2~Example 6

In Examples 2 to 6, solid electrolytic capacitors each of which has a similar structure to that in Example 1 were fabricated, except that instead of APTES that was contained in the first electrically conductive layer 5 in the case of Example 1 described above, octadecyltriethoxysilane (OTES), n-propyltrichlorosilane (nPTCS), dimethoxydiphenylsilane (DMDPS), methylphenyldichlorosilane (MPDCS), and mercaptopropyltrimethoxysilane (MPTMS) were contained in the cases of Examples 2 to 6 respectively.

In addition, in respective fabrication processes of the solid electrolytic capacitors according to Examples 2 to 6, the solid electrolytic capacitors were fabricated in a similar manner to the case of Example 1 using a similar aqueous solution, except that instead of the APTES addition into the aqueous solution, which was used in the case of Example 1 and into which the anode 1 was soaked, OTES, nPTCS, DMDPS, MPDCS, and MPTMS were added in the cases of Examples 2 to 6 respectively.

Comparative Example 1

In Comparative Example 1, a solid electrolytic capacitor was fabricated in a similar manner to the case of Example 1, except that an aqueous solution added with no APTES was used instead of the aqueous solution added with APTES, which was used in the case of Example 1 and into which the anode 1 was soaked.

More specifically, in Comparative Example 1, soaking an anode formed with an electrolyte layer into an aqueous solution prepared in such a way that graphite particles with a grain size of approximately 1 μm to approximately 10 μm, water, and a binder were mixed in a weight ratio of approximately 1:10:0.0005 allowed a first electrically conductive layer containing the graphite particles with a grain size of approximately 1 μm to approximately 10 μm but not APTES to be formed.

Meanwhile, ESR measurements were performed at a frequency of approximately 100 kHz on the solid electrolytic capacitors fabricated in the cases of Examples 1 to 6 and Comparative Example 1. The ESR measurements were performed using an LCR meter by applying voltage between the cathode terminal 7 and the anode terminal 8. The measurement results are listed in Table 1. In addition, Table 1 lists values determined by normalizing the measurement results in Examples 1 to 6 and Comparative Example 1 using the measurement result in Comparative Example 1 as a reference value of 100.

TABLE 1

|  | First electrically conductive layer | ESR |
|---|---|---|
| Example 1 | containing APTES | 78 |
| Example 2 | containing OTES | 84.2 |
| Example 3 | containing nPTCS | 81.9 |
| Example 4 | containing DMDPS | 87.7 |
| Example 5 | containing MPDCS | 90.3 |
| Example 6 | containing MPTMS | 87.7 |
| Comparative Example 1 | — | 100 |

As listed in Table 1, it turned out that the ESR of any of the solid electrolytic capacitors in Examples 1 to 6 was reduced lower than that of the solid electrolytic capacitor in Comparative Example 1. It was thus clarified that forming the first electrically conductive layer 5a containing an organic silane enabled the ESR to be reduced. It was also clarified that the organic silane to be contained in the first electrically conductive layer 5a in order to reduce the ESR was preferably APTES, OTES, nPTCS, DMDPS, or MPTMS.

Example 7

In Example 7, solid electrolytic capacitors each of which has a similar structure to that in Example 1 were fabricated, except that instead of the APTES concentration of approximately 1.1 wt. % (the weight ratio of the APTES to a total of the APTES and the graphite particles), which was contained in the first electrically conductive layer 5a in the case of Example 1 described above, the APTES concentration was varied in the range of approximately 0.01 wt. % to approximately 11.1 wt. % in the case of Example 7.

In addition, in respective fabrication processes of the solid electrolytic capacitors according to Example 7, the solid electrolytic capacitors were fabricated in a similar manner to the case of Example 1 using a similar aqueous solution, except that instead of the APTES with the concentration of approximately 1.1 wt. % added in the aqueous solution, which was used in the case of Example 1 and into which the anode 1 was soaked, APTES with a concentration range of approximately 0.01 wt. % to approximately 11.1 wt. % was added in the case of Example 7.

Then, ESR measurements were performed at a frequency of approximately 100 kHz on the solid electrolytic capacitors fabricated in the cases of Examples 1 and 7. The ESR measurements were performed using an LCR meter by applying voltage between the cathode terminal 7 and the anode terminal 8. The measurement results are listed in Table 2. In addition, Table 2 lists values determined by normalizing the measurement results in Examples 1 and 7 using the measurement result in Comparative Example 1 as a reference value of 100.

TABLE 2

|  | APTES concentration (wt. %) | ESR |
| --- | --- | --- |
| Example 7 | 0.01 | 93.6 |
|  | 0.05 | 92.1 |
|  | 0.07 | 91.5 |
|  | 0.1 | 79.6 |
|  | 0.2 | 79.4 |
|  | 0.5 | 79.1 |
|  | 0.8 | 78.6 |
|  | 2.2 | 78.2 |
|  | 3.3 | 78.3 |
|  | 5.5 | 79.6 |
|  | 7.7 | 91.2 |
|  | 8.8 | 93.5 |
|  | 11.1 | 97.5 |
| Example 1 | 1.1 | 78.0 |

As listed in Table 2, it turned out that the ESR in any of the solid electrolytic capacitors in Examples 1 and 7 was reduced lower than that of the solid electrolytic capacitor in Comparative Example 1.

It was also clarified that the APTES concentration to be contained in the first electrically conductive layer 5a was preferably from approximately 0.1 wt. % to approximately 5.5 wt. %. More preferably, the concentration was from approximately 0.8 wt. % to approximately 3.3 wt. %. This numeric range can be considered effective not only for APTES but also for other examples of the present invention.

Also, the virtually plate-like anode 1 comprised of a porous sintered body was used in Examples 1 to 7. Because this causes a contact area between the electrolyte layer 3 and the cathode 5 to be increased, and also micro-irregularities are formed on the surface of the electrolyte layer 3, the adhesiveness between the electrolyte layer 3 and the cathode 5 is improved. As a result, the ESR can be further reduced.

Further, the anode comprised of tantalum that is a valve metal is used in Examples 1 to 7. For this reason, anodizing the anode 1 enables a dielectric layer consisting mainly of tantalum oxide to be readily obtained.

In addition, all of the examples disclosed herein are for illustrative purposes in all aspects, and should not be considered limiting. The scope of the present invention is defined not by the description of the above-described examples but by the appended claims, and includes all equivalents and variations that fall within the scope of the claims.

For example, in the above-described examples, the first electrically conductive layer 5 contained APTES, OTES, nPTCS, DMDPS, MPDCS, or MPTMS; however, the present invention is not limited to this, and it may be comprised of other methylsilane, phenylsilane, vinylsilane, alkoxysilane, mercaptosilane, or aminosilane or, alternatively, contain at least one organic silane selected from the group consisting of the above organic silanes. Further, the first electrically conductive layer 5a may contain a material other than the above organic silanes.

Also, in the above-described examples, the first electrically conductive layer 5a contained graphite particles; however, the present invention is not limited to this, and it may contain carbon particles other than the graphite particles.

Further, in the above-described examples, the first electrically conductive layer 5a was formed by soaking the electrolyte layer 3 into an aqueous solution containing carbon particles and an organic silane; however, the present invention is not limited to this, and it may be formed by depositing carbon particles and an organic silane using a method such as spraying the above aqueous solution onto the surface of the electrolyte layer 3.

Still further, in the above-described examples, the electrolyte layer 3 was comprised of polypyrrole; however, the present invention is not limited to this, and it may consist mainly of an electrically conductive polymer or, alternatively, of manganese oxide.

Still further, in the above-described examples, the cathode was comprised of tantalum, however, the present invention is not limited to this, and it may consist mainly of another valve metal such as aluminum, niobium, or titanium or, alternatively, it may be an alloy consisting mainly of such a valve metal.

Still further, in the above-described examples, the phosphoric acid solution was used for anodizing the anode 1; however, the present invention is not limited to this, an aqueous solution containing fluorine such as ammonium fluoride solution, potassium fluoride solution, sodium fluoride solution or hydrofluoric acid solution or, alternatively, sulfuric acid may be used.

Still further, in the above-described examples, the anode 1 was in the form of a virtual plate comprised of a porous sintered body; however, the present invention is not limited to this, and it may be comprised of a metal sheet or a metal foil.

What is claimed is:

1. A solid electrolytic capacitor comprising:
    a dielectric layer mainly comprising an oxide of a metal, the dielectric layer being formed on an anode mainly comprising the same metal;
    an electrolyte layer mainly comprising manganese oxide or an electrically conductive polymer, the electrolyte layer being formed on the dielectric layer; and
    a cathode having an electrically conductive layer containing carbon particles and an organic silane, the cathode being formed on the electrolyte layer;
    wherein an anode terminal is connected to the anode, a cathode terminal is connected to the cathode, and a mold resin is formed such that respective edges of the anode terminal and the cathode terminal are located outside the mold resin;
    wherein the organic silane includes octadecyltriethoxysilane (OTES).

2. The solid electrolytic capacitor element according to claim 1, wherein the electrically conductive layer contains the organic silane in a range of approximately 0.1 wt. % to approximately 5.5 wt. % out of a total of the organic silane and the carbon particles.

3. The solid electrolytic capacitor element according to claim 1, wherein the electrically conductive layer contains the organic silane in a range of approximately 0.8 wt. % to approximately 3.3 wt. % out of a total of the organic silane and the carbon particles.

4. The solid electrolytic capacitor element according to claim 1, wherein the cathode has a laminated structure comprising:
   a first electrically conductive layer containing the carbon particles and the organic silane; and
   a second electrically conductive layer mainly comprising silver particles.

5. The solid electrolytic capacitor element according to claim 4, wherein the first electrically conductive layer has a thickness of approximately 2 μm to approximately 15 μm.

6. A solid electrolytic capacitor comprising:
   a dielectric layer mainly comprising an oxide of a metal, the dielectric layer being formed on an anode mainly comprising the same metal;
   an electrolyte layer mainly comprising manganese oxide or an electrically conductive polymer, the electrolyte layer being formed on the dielectric layer; and
   a cathode having an electrically conductive layer containing carbon particles and an organic silane, the cathode being formed on the electrolyte layer;
   wherein an anode terminal is connected to the anode, a cathode terminal is connected to the cathode, and a mold resin is formed such that respective edges of the anode terminal and the cathode terminal are located outside the mold resin;
   wherein the organic silane includes n-propyltrichlorosilane (nPTCS).

7. The solid electrolytic capacitor element according to claim 6, wherein the electrically conductive layer contains the organic silane in a range of approximately 0.1 wt. % to approximately 5.5 wt. % out of a total of the organic silane and the carbon particles.

8. The solid electrolytic capacitor element according to claim 6, wherein the electrically conductive layer contains the organic silane in a range of approximately 0.8 wt. % to approximately 3.3 wt. % out of a total of the organic silane and the carbon particles.

9. The solid electrolytic capacitor element according to claim 6 wherein the cathode has a laminated structure comprising:
   a first electrically conductive layer containing the carbon particles and the organic silane; and
   a second electrically conductive layer mainly comprising silver particles.

10. The solid electrolytic capacitor element according to claim 9, wherein the first electrically conductive layer has a thickness of approximately 2 μm to approximately 15 μm.

* * * * *

UNITED STATES PATENT AND TRADEMARK OFFICE
CERTIFICATE OF CORRECTION

PATENT NO. : 7,599,170 B2 Page 1 of 1
APPLICATION NO. : 11/438769
DATED : October 6, 2009
INVENTOR(S) : Takahisa Iida et al.

It is certified that error appears in the above-identified patent and that said Letters Patent is hereby corrected as shown below:

On the Title page, in field [75] two inventor names and respective places of residence are omitted:

Mutsumi Yano, Hirakata (JP)

Mamoru Kimoto, Hirakata (JP)

Signed and Sealed this

Fifth Day of January, 2010

David J. Kappos
*Director of the United States Patent and Trademark Office*